No. 778,720. PATENTED DEC. 27, 1904.
W. M. STEWART.
DEHORNING DEVICE.
APPLICATION FILED AUG. 27, 1904.
2 SHEETS—SHEET 2.
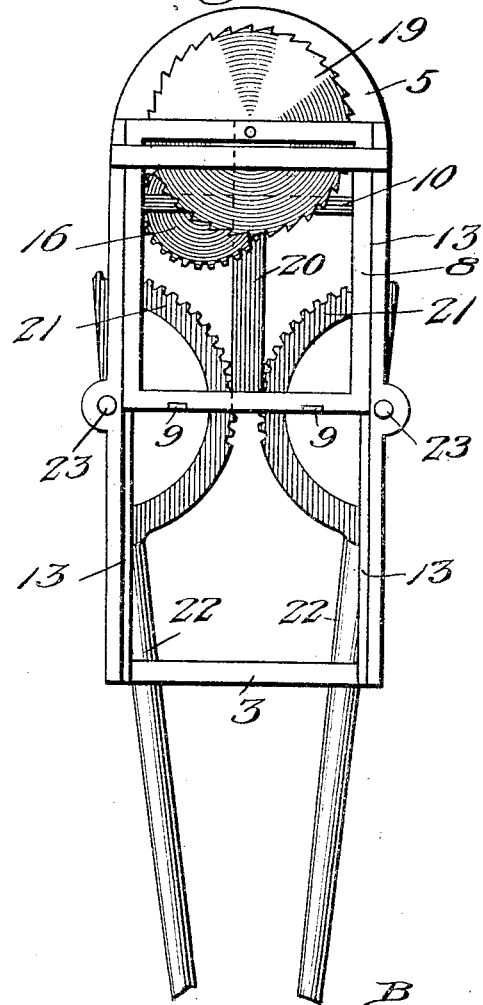
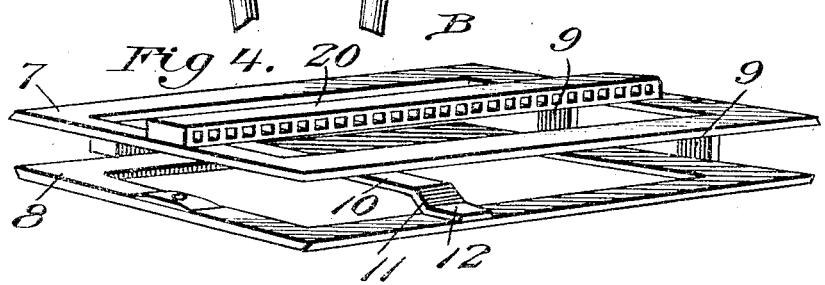
Inventor
W. M. Stewart.
Witnesses
Phil E. Barnes.
W. H. Clarke.
By Victor J. Evans
Attorney No. 778,720. Patented December 27, 1904.

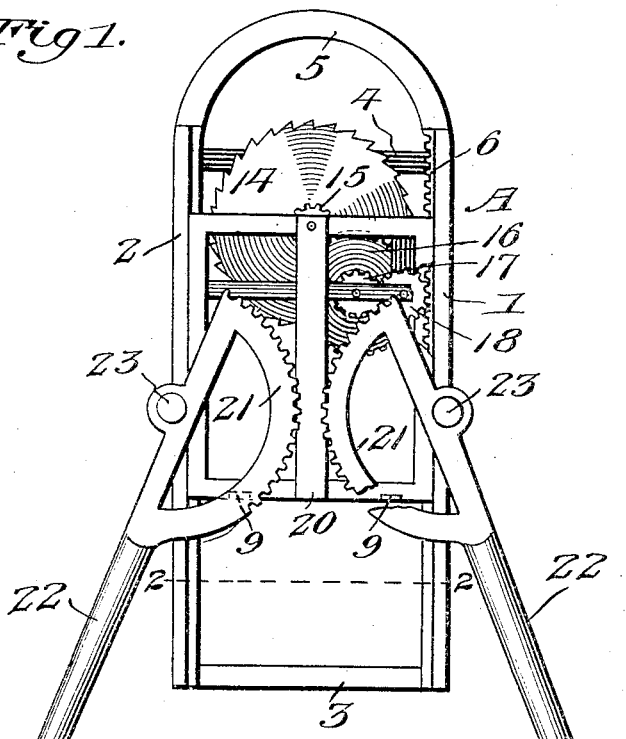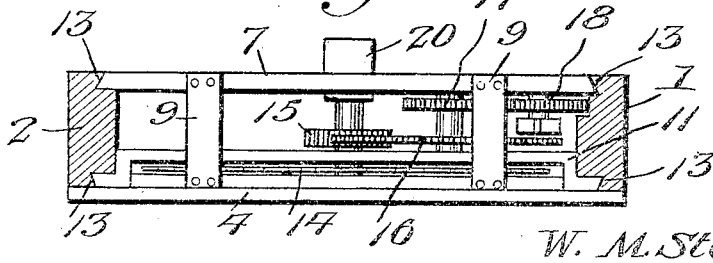

UNITED STATES PATENT OFFICE.

WILLIAM M. STEWART, OF SPRINGFIELD, COLORADO.

DEHORNING DEVICE.

SPECIFICATION forming part of Letters Patent No. 778,720, dated December 27, 1904.

Application filed August 27, 1904. Serial No. 222,458.

*To all whom it may concern:*

Be it known that I, WILLIAM M. STEWART, a citizen of the United States, residing at Springfield, in the county of Baca and State of Colorado, have invented new and useful Improvements in Dehorning Devices, of which the following is a specification.

This invention relates to dehorning devices.

In cattle districts where it is necessary to remove the horns from large numbers of cattle it has been customary to use a handsaw. This method of operation is objectionable for several reasons. In the first place it consumes much time and labor, and as the animals frequently become nervous or restless additional labor is required in holding them quiet during the tedious operation. Furthermore, the suffering of the animal is inhumanely prolonged.

When a handsaw is not employed to remove the horns, a clipping or shearing device is frequently used. While the clipping device has its advantages over the handsaw, it is yet defective in that unless the cattle be young it crushes or mutilates the horns. Furthermore, when the cattle are old and the horns are tough the clipping or shearing device sometimes breaks during the operation or becomes firmly wedged in the partly-severed horn, thus causing difficulty to the operative and imposing unnecessary pain upon the animal. A further objection to the shearing or clipping device is that it fails frequently to sever the horn close enough to the animal's head to prevent it from growing again.

The object of the present invention is to dehorn cattle in a quick and effective manner, thus saving the time and labor of the operative and avoiding unnecessary or prolonged suffering of the cattle.

With the foregoing and other minor objects in view, which will appear as the description proceeds, the invention resides in a dehorning device comprising a supporting-frame, a saw-frame slidable therein, a rotary saw carried by the saw-frame, means for sliding the saw-frame, and means actuated by the movement of the saw-frame for operating the rotary saw.

The invention also resides in the particular combination and arrangements of parts and in the precise details of construction hereinafter described and claimed as a practical embodiment thereof.

In the accompanying drawings, forming part of this specification, Figure 1 is a side elevation of a dehorning device constructed in accordance with the invention. Fig. 2 is a horizontal section on the line 2 2 of Fig. 1 looking from below, the operating-handle being removed. Fig. 3 is a view similar to Fig. 1 looking from the opposite side of the device, the operating-handles being shown in closed position. Fig. 4 is a perspective view of the saw-frame removed from the supporting-frame for the purpose of illustration.

Like reference characters indicate like parts in the different views.

The supporting-frame A preferably is formed with parallel side pieces 1 2, connected by cross-pieces 3 4 and having a rounded end or yoke 5, which is adapted to be fitted over the horn that is to be severed. The side piece 1 is provided with a rack 6.

The saw-frame B preferably comprises supplemental frames 7 8, which are held together by connecting-pieces 9 at their lower ends and by a strap 10 at their upper ends, said strap 10 being bent, as shown at 11, so that its ends 12 are connected with the supplemental frame 8 and its intermediate portions with the supplemental frame 7. The saw-frame B is slidable as a whole in dovetail grooves 13, formed in the side pieces 1 and 2 of the supporting-frame. Journaled in the saw-frame B in any suitable manner is a rotary saw 14, provided with a gear-wheel 15, meshing with a large gear-wheel 16, having thereon a small gear-wheel 17, in mesh with a gear-wheel 18, all of said gear-wheels being journaled upon the saw-frame and the last-mentioned gear-wheel 18 meshing with the rack 6 upon the supporting-frame. By means of the gearing described the rotary saw 14 is operated at a high rate of speed by the sliding movement of the saw-frame in the supporting-frame. The saw 14 is mounted in a plane slightly to one side of the rounded end or yoke 5 of the supporting-frame, so that as the saw-frame moves upward in the supporting-frame the saw will extend slightly beyond the inner edge of the yoke, as shown at 19 in Fig. 3, thus making a clean and complete cut of the horn.

The saw-frame B is provided with a double-sided rack 20, with which mesh segmental gear elements 21, carried by operating-arms 22, pivoted upon the supporting-frame, as shown at 23.

By spreading the operating-handles 23 apart the saw-frame is moved away from the yoke 5, thus permitting said yoke to be fitted over the horn of an animal. By moving the operating-handles toward each other the saw-frame is moved toward said yoke, and the multiplying-gear, which has been described, rotates the saw at such a high rate of speed as to insure a quick and practically painless severing of the horn at a single operation.

The device of this invention is adapted to sever the horn close enough to the head to prevent it from growing again, and it will be understood that this is accomplished by turning the device so that the side of the saw-frame on which the saw is journaled is close to the head of the animal—that is to say, the side of the frame which is shown in Fig. 3 will be adjacent to the base of the horn.

Furthermore, the device of this invention is adapted to sever the horn at any desired angle, thus "shaping" the stump of the horn close to the head of the animal.

Changes in the precise embodiment of the invention illustrated and described may be made within the scope of the following claims without departing from the spirit of the invention or sacrificing any of its advantages.

Having thus fully described the invention, what is claimed as new is—

1. A dehorning device comprising a supporting-frame, a saw-frame movable therein, a saw carried by the saw-frame, means for moving the saw-frame, and means actuated by the movement of the saw-frame for operating the saw.

2. A dehorning device comprising a supporting-frame provided with a yoke, a saw-frame movable in the supporting-frame, a rotary saw carried by the saw-frame, a rack on the supporting-frame, gearing carried by the saw-frame for operating the saw, said gearing meshing with the rack, a double-sided rack on the saw-frame, and operating-arms pivoted upon the supporting-frame and having gear elements meshing with the double-sided rack.

3. A dehorning device comprising a supporting-frame having a yoke and parallel sides, a saw-frame slidable in the supporting-frame, a saw carried by the saw-frame in a plane slightly to one side of the yoke and being adapted to move beyond the inner edge of the yoke, a rack carried by the supporting-frame, gearing carried by the saw-frame for operating the saw, said gearing meshing with the rack, a double-sided rack on the saw-frame, and operating-arms pivoted upon the supporting-frame and having segmental gear elements meshing with the double-sided rack.

In testimony whereof I affix my signature in presence of two witnesses.

WILLIAM M. STEWART.

Witnesses:
   DELLA M. WILDE,
   F. M. WILDE.